United States Patent
Chen et al.

(10) Patent No.: US 11,460,856 B2
(45) Date of Patent: Oct. 4, 2022

(54) SYSTEM AND METHOD FOR TACTICAL BEHAVIOR RECOGNITION

(71) Applicant: Honda Motor Co., Ltd., Tokyo (JP)

(72) Inventors: Yi-Ting Chen, Sunnyvale, CA (US);
Chengxi Li, West Lafayette, IN (US);
Yue Meng, Elmsford, NY (US)

(73) Assignee: HONDA MOTOR CO., LTD., Tokyo (JP)

( * ) Notice: Subject to any disclaimer, the term of this patent is extended or adjusted under 35 U.S.C. 154(b) by 458 days.

(21) Appl. No.: 16/728,581

(22) Filed: Dec. 27, 2019

(65) Prior Publication Data

US 2021/0080971 A1 Mar. 18, 2021

Related U.S. Application Data

(60) Provisional application No. 62/900,035, filed on Sep. 13, 2019.

(51) Int. Cl.

| | |
|---|---|
| *G06F 16/00* | (2019.01) |
| *G05D 1/02* | (2020.01) |
| *G06F 16/901* | (2019.01) |
| *G07C 5/06* | (2006.01) |
| *G05D 1/00* | (2006.01) |
| *G06V 20/56* | (2022.01) |

(52) U.S. Cl.
CPC ......... *G05D 1/0253* (2013.01); *G05D 1/0088* (2013.01); *G06F 16/9024* (2019.01); *G06V 20/56* (2022.01); *G07C 5/06* (2013.01); *G05D 2201/0212* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 2020/0097003 A1* | 3/2020 | Wray | G08G 1/096775 |
| 2022/0126864 A1* | 4/2022 | Moustafa | B60W 50/14 |
| 2022/0126878 A1* | 4/2022 | Moustafa | H04L 9/3213 |

OTHER PUBLICATIONS

Yujia Li, Daniel Tarlow, Marc Brockschmidt, and Richard Zemel, "Gated Graph Sequence Neural Networks," ICLR 2016.

(Continued)

*Primary Examiner* — James M McPherson
(74) *Attorney, Agent, or Firm* — Rankin, Hill & Clark LLP (57) ABSTRACT

Systems and methods for driver behavior recognition is provided. In one embodiment a computer implemented method includes receiving image data associated with a general objects. The method also includes identifying a reactive object and an inert object from the general objects based on the image data. An ego reactive graph is generated for the reactive object based on a reactive feature of the reactive object and a reactive position vector. An ego inert graph is generated for the inert object based on an inert feature of the inert object and an inert distance. The method further includes performing interaction modeling based on the ego reactive graphs and the ego inert graphs to generate updated features. The method also includes performing temporal modeling on the updated features. The method further includes determining an egocentric representation of a tactical driver behavior based at least in part on the updated features.

20 Claims, 7 Drawing Sheets

(56) References Cited

OTHER PUBLICATIONS

A. Alahi, K. Goel, V. Ramanathan, A. Robicquet, L. Fei-Fei, and S. Savarese. Social LSTM: Human Trajectory Prediction in Crowded Spaces. In CVPR, 2016.
J. L. Ba, J. R. Kiros, and G. E. Hinton. Layer Normalization. In arXiv preprint arXiv: 1607.06450, 2016.
I. A. Barsan, P. Liu, M. Pollefeys, and A. Geiger. Robust Dense Mapping for Large-Scale Dynamic Environments. In ICRA, 2018.
S. R. Bulò, L. Porzi, and P. Kontschieder. In-Place Activated BatchNorm for Memory-Optimized Training of DNNs. In CVPR, 2018.
J. Carreira and A. Zisserman. Quo Vadis, Action Recognition? A New Model and the Kinetics Dataset. In CVPR, 2017.
R. Chandra, U. Bhattacharya, A. Bera, and D. Manocha. TraPHic: Trajectory Prediction in Dense and Heterogeneous Traffic Using Weighted Interactions. In CVPR, 2019.
C. Chen, Y. Liu, S. Kreiss, and A. Alahi. Crowd-Robot Interaction: Crowd-aware Robot Navigation with Attention-based Deep Reinforcement Learning In ICRA, 2019.
A. Doshi and M. M. Trivedi. Tactical Driver Behavior Prediction and Intent Inference: A Review. In ITSC, 2011.
T. Gindele, S. Brechtel, and R. Dillmann. Learning Driver Behavior Models from Traffic Observations for Decision Making and Planning. IEEE Intelligent Transportation Systems Magazine, 7(1):69-79, 2015.
K. He, G. Gkioxari, P. Dollar, and R. Girshickn. Mask R-CNN. In CVPR, 2017.
R. Herzig, E. Levi, H. Xu, E. Brosh, A. Globerson, and T. Darrell. Classifying Collisions with Spatio-Temporal Action Graph Networks. In ITSC, 2011.
A. Jain, H. Koppula, B. Raghavan, S. Soh, and A. Saxena. Car that Knows before You Do: Anticipating Maneuvers via Learning Temporal Driving Models. In ICCV, 2015.
W. Kay, J. Carreira, K. Simonyan, B. Zhang, C. Hillier, S. Vijayanarasimhan, F. Viola, T. Green, T. Back, P. Natsev, M. Suleyman, and A. Zisserman. The Kinetics Human Action Video Dataset. In arXiv preprint arXiv:1705.06950, 2017.
D. P. Kingma and J. Ba. Adam: A Method for Stochastic Optimization. In arXiv preprint arXiv:1412.6980, 2014.
T. N. Kipf and M. Welling. Semi-supervised Classification with Graph Convolutional Networks. In ICLR, 2017.
V. Kosaraju, A. Sadeghian, R. Martin-Martin, I. Reid, S. H. Rezatofighi, and S. Savarese. Social-BiGAT: Multimodal Trajectory Forecasting using Bicycle-GAN and Graph Attention Networks. In NeurIPS, 2019.
N. Kuge, T. Yamamura, O. Shimoyama, and A. Liu. A driver behavior recognition method based on a driver model framework. In SAE 2000 World Congress, 2000.
K. Lasinger, R. Ranftl, K. Schindler, and V. Koltun. Towards Robust Monocular Depth Estimation: Mixing Datasets for Zero-Shot Cross-Dataset Transfer. In arXiv preprint arXiv:1907.01341, 2019.
N. Lee, W. Choi, P. Vernaza, C. Choy, P. Torr, and M. Chandraker. DESIRE: Distant Future Prediction in Dynamic Scenes with Interacting Agents. In CVPR, 2017.
R. Li, M. Tapaswi, R. Liao, J. Jia, R. Urtasun, and S. Fidler. Situation Recognition with Graph Neural Networks. In CCV, 2017.
D. Mitrović. Reliable Method for Driving Events Recognition. IEEE Transactions on Intelligent Transportation Systems, 6(2):198-205, 2005.
M. Müller, A. Dosovitskiy, B. Ghanem, and V. Koltun. Driving Policy Transfer via Modularity and Abstraction. In CoRL, 2018.
A. Narayanan, Y.-T. Chen, and S. Malla. Semi-supervised Learning: Fusion of Self-supervised, Supervised Learning, and Multimodal Cues for Tactical Driver Behavior Detection. In CVPRW, 2018.
N. Oliver and A. Pentland. Graphical Models for Driver Behavior Recognition in a SmartCar. In IV, 2000.
S. Qi and S.-C. Zhu. Intent-aware Multi-agent Reinforcement Learning. In ICRA, 2018.
V. Ramanishka, Y.-T. Chen, T. Misu, and K. Saenko. Toward Driving Scene Understanding: A Dataset for Learning Driver Behavior and Causal Reasoning. In CVPR, 2018.
J. Redmon, S. Divvala, R. Girshick, and A. Farhadi. You Only Look Once: Unified, Real-Time Object Detection. In CVPR, 2016.
S. Ren, K. He, R. Girshick, and J. Sun. Faster R-CNN: Towards Real-Time Object Detection with Region Proposal Networks. In NeurIPS, 2015.
O. Russakovsky, J. Deng, H. Su, J. Krause, S. Satheesh, S. Ma, Z. Huang, A. Karpathy, A. Khosla, M. Bernstein, A. C. Berg, and L. Fei-Fei. ImageNet Large Scale Visual Recognition Challenge. In IJCV, 2015.
M. Schmidt, U. Hofmann, and M. Bouzouraa. A Novel Goal Oriented Concept for Situation Representation for ADAS and Automated Driving. In ITSC, 2014.
J. Schulz, C. Hubmann, N. Morin, J. Lochner, and D. Burschka. Learning Interaction-Aware Probabilistic Driver Behavior Models from Urban Scenarios In IV, 2019.
C. Sun, P. Karlsson, J. Wu, J. B. Tenenbaum, and K. Murphy. Stochastic Prediction of Multi-Agent Interactions from Partial Observations. In ICLR, 2019.
C. Szegedy, V. Vanhoucke, S. Ioffe, J. Shlens, and Z. Wojna. Rethinking the Inception Architecture for Computer Vision. In CVPR, 2016.
D. Tran, L. Bourdev, R. Fergus, L. Torresani, and M. Paluri. Learning Spatiotemporal Features with 3D Convolutional Networks In ICCV, 2015.
A. Vemula, K. Muelling, and J. Oh. Social Attention: Modeling Attention in Human Crowds. In ICRA, 2018.
C.-Y. Wang, A. Narayanan, A. Patil, W. Zhan, and Y.-T. Chen. A 3D Dynamic Scene Analysis Framework for Development of Intelligent Transportation Systems. In IV, 2018.
D. Wang, C. Devin, Q.-Z. Cai, F. Yu, and T. Darrell. Deep Object-Centric Policies for Autonomous Driving. In ICRA, 2019.
X. Wang and A. Gupta. Videos as Space-Time Region Graphs. In ECCV, 2018.
B.-F. Wu, Y.-H. Chen, C. Yeh, and Y.-F. Li. Reasoning-Based Frame-work for Driving Safety Monitoring using Driving Event Recognition IEEE Transactions on Intelligent Transportation Systems, 14(3):1231-1241, 2013.
J. Wu, L. Wang, L. Wang, J. Guo, and G. Wu. Learning Actor Relation Graphs for Group Activity Recognition. In CVPR, 2019.
Z. Wu, S. Pan, F. Chen, G. Long, C. Zhang, and P. S. Yu. A Comprehensive Survey on Graph Neural Networks. In arXiv: 1901.00596, 2019.
H. Xu, Y. Gao, F. Yu, and T. Darrell. End-To-End Learning of Driving Models From Large-Scale Video Datasets. In CVPR, 2016.
M. Xu, M. Gao, Y.-T. Chen, L. Davis, and D. Crandall. Temporal Recurrent Networks for Online Action Detection. In ICCV, 2019.
S. Yan, Y. Xiong, and D. Lin. Spatial Temporal Graph Convolutional Networks for Skeleton-Based Action Recognition. In AAAI, 2018.
J. Yang, J. Lu, S. Lee, D. Batra, and D. Parikh. Graph R-CNN for Scene Graph Generation. In ECCV, 2018.
W. Zhan, C. Liu, C.-Y. Chan, and M. Tomizuka. A Nonconservatively Defensive Strategy for Urban Autonomous Driving. In ITSC, 2016.
B. Zhou, A. Andonian, A. Oliva, and A. Torralba. Temporal relational reasoning in videos. In ECCV, 2018.

* cited by examiner

SYSTEM AND METHOD FOR TACTICAL BEHAVIOR RECOGNITION

CROSS-REFERENCE TO RELATED APPLICATION

This application claims priority to U.S. Provisional Application Ser. No. 62/900,035 filed on Sep. 13, 2019, which is expressly incorporated herein by reference.

BACKGROUND

Automated driving in highly interactive scenarios is challenging as it involves different levels of three dimensional scene analysis, situation understanding, intention prediction, decision making, and planning. Earlier works utilized hidden Markov model variants to recognize driving events. Dynamic Bayesian network based models have also been devised to model interactions between drivers and environments. Recurrent neural network based models have also been proposed to learn complex interactions between human and human in coded areas. However, the aforementioned models suffer from modeling complex interactions effectively.

BRIEF DESCRIPTION

According to one aspect, a computer-implemented method for tactical behavior recognition is provided. The method includes receiving image data associated with a surrounding environment of an ego object. The surrounding environment includes general objects. The method also includes identifying a reactive object and an inert object from the general objects based on the image data. An an ego reactive graph is generated for the reactive object based on a reactive feature of the reactive object and a reactive position vector of the reactive object relative to the general objects. An ego inert graph is generated for the inert object based on an inert feature of the inert object and an inert distance between the inert object and the ego object. The method further includes performing interaction modeling based on the ego reactive graphs and the ego inert graphs to generate updated features. The method also includes performing temporal modeling on the updated features. The method further includes determining an egocentric representation of a tactical driver behavior based at least in part on the updated features.

According to another aspect, a system for tactical behavior recognition is provided. The system includes an object module, a graph module, a fusion module, and a behavior recognition module. The object module is configured to receive image data associated with a surrounding environment of an ego object and identify a reactive object and an inert object from the surrounding environment based on the image data. The graph module is configured to generate an ego reactive graph for the reactive object based on a reactive feature of the reactive object and a reactive position vector of the reactive object relative to the general objects. The graph module is also configured to generate an ego inert graph for the inert object based on an inert feature of the inert object and an inert distance between the inert object and the ego object. The fusion module is configured to perform interaction modeling based on the ego reactive graphs and the ego inert graphs to generate updated features and performs temporal modeling on the updated features. The behavior recognition module is configured to determine an egocentric representation of a tactical driver behavior based at least in part on the updated features.

According to yet another aspect, a non-transitory computer readable storage medium storing instructions that when executed by a computer, which includes a processor perform a method. The method includes receiving image data associated with a surrounding environment of an ego object. The surrounding environment includes general objects. The method also includes identifying a reactive object and an inert object from the general objects based on the image data. An ego reactive graph is generated for the reactive object based on a reactive feature of the reactive object and a reactive position vector of the reactive object relative to the general objects. An ego inert graph is generated for the inert object based on an inert feature of the inert object and an inert distance between the inert object and the ego object. The method further includes performing interaction modeling based on the ego reactive graphs and the ego inert graphs to generate updated features. The method also includes performing temporal modeling on the updated features. The method further includes determining an egocentric representation of a tactical driver behavior based at least in part on the updated features.

DETAILED DESCRIPTION

Conventional models are designed to model a single aspect of behavior, and therefore, are unable to effectively model complex interactions. The systems and methods described herein utilize an egocentric spatial-temporal interaction model that focus on the interaction between an ego object, a reactive object, and an inert object for tactical behavior recognition. In particular, an ego reactive graph and an ego inert graph are both used by the graph neural network is designed with a specific focus to recognize tactical driver behavior.

Definitions

The following includes definitions of selected terms employed herein. The definitions include various examples and/or forms of components that fall within the scope of a term and that can be used for implementation. The examples are not intended to be limiting. Furthermore, the components discussed herein, can be combined, omitted, or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, object computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wide-band (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein can include input and/or output devices for receiving input and/or devices for outputting data. The input and/or output can be for controlling different object features, which include various object components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface, which can be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk, data store, and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, plasma display panels, touch screen displays, among others, that are often found in objects to display information about the object. The display can receive input (e.g., touch input, keyboard input, input from various other input devices, etc.) from a user. The display can be accessible through various devices, for example, though a remote system. The display may also be physically located on a portable device, mobility device, or object.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, any number of modules, and so on. The logic circuitry can include one or more gates, combinations of gates, or other circuit components. Where multiple logics and/or modules are described, it may be possible to incorporate the multiple logics and/or modules into one physical logic. Similarly, where a single logic or module is described, it can be possible to distribute that single logic or module between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Object system," as used herein can include, but is not limited to, any automatic or manual systems that can be used to enhance the object, traversal, and/or safety. Exemplary ego object systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), a climate control system, an electronic pretensioning system, a monitoring system, a passenger detection system, a suspension system, a seat configuration system, a cabin lighting system, an audio system, a sensory system, an interior or exterior camera system among others.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely. The portable object may be associated with an ego object, a reactive object, or an inert object.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

"Vehicle," as used herein, refers to any moving vehicle that is capable of carrying one or more users and is powered by any form of energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is powered entirely or partially by one or more electric motors powered by an electric battery. The EV can include battery electric vehicles (BEV), plug-in hybrid electric vehicles (PHEV), and extended range electric vehicles (EREVs). The term "vehicle" can also refer to an autonomous vehicle and/or self-driving vehicle powered by any form of energy. The autonomous vehicle can carry one or more users. Further, the term "vehicle" can include vehicles that are automated or non-automated with pre-determined paths or free-moving vehicles.

I. System Overview

Figure 1:
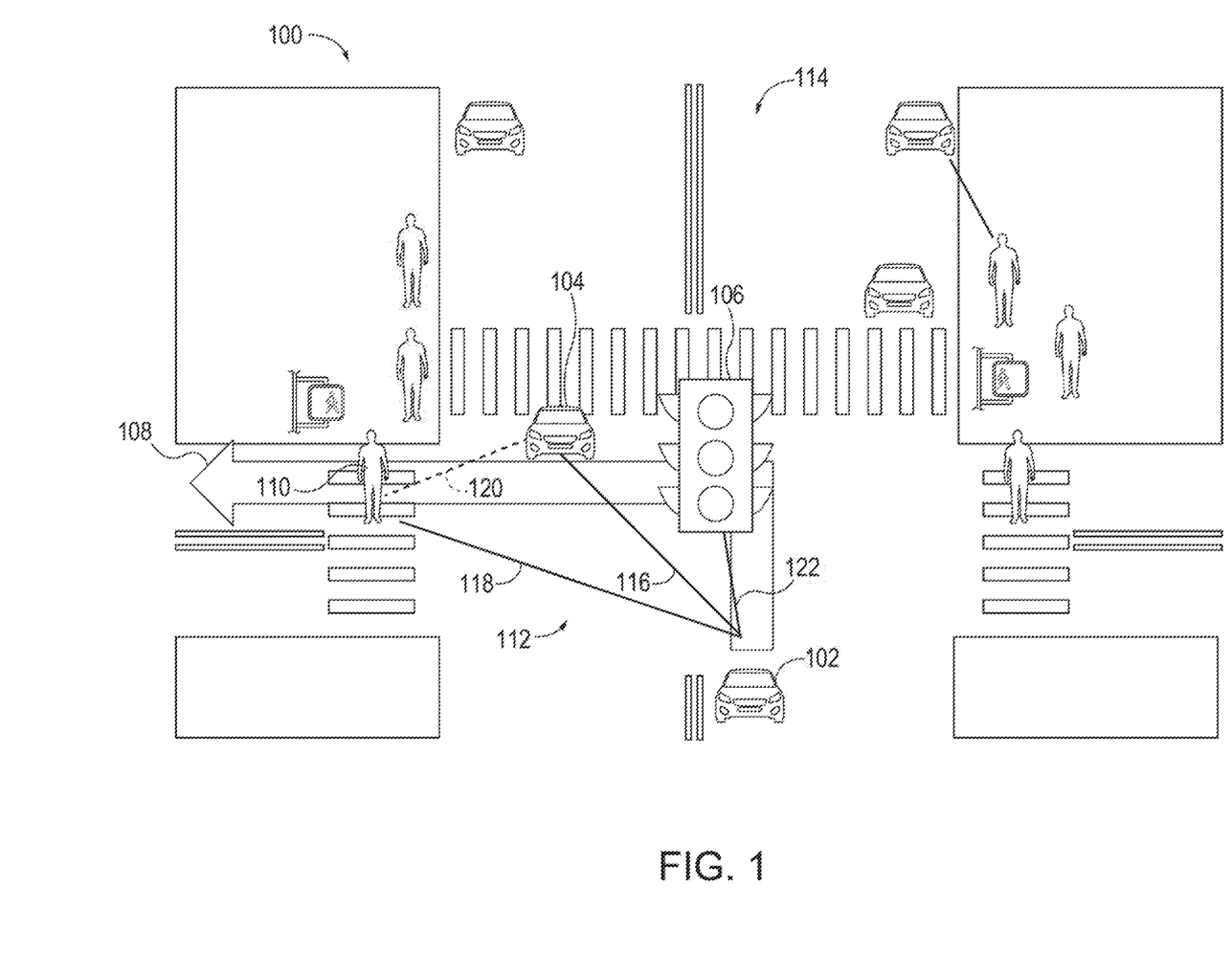
FIG. 1 is a schematic view of an ego object in an exemplary traffic scenario according to an exemplary embodiment.

Referring now to the drawings, the showings are for purposes of illustrating one or more exemplary embodiments and not for purposes of limiting the same. FIG. 1 is a schematic view of an exemplary traffic scenario on roadways 100 forming an intersection according to an exemplary embodiment. The roadways 100 can include any type of path, road, highway, freeway, or travel route. The roadways 100 can have various configurations not shown in FIG. 1. For example, the roadways 100 can have any number of lanes or use any number of paths. The roadways 100 are traversed by one or more objects, such as an ego object 102, a reactive object 104, and an inert object 106.

The systems and methods are described from the perspective of the ego object 102. For clarity, the ego object 102 is described as a host vehicle, however, the ego object 102 may be any object that traverses an environment and is capable of perceiving its environment and may also be capable of path planning. For example, the ego object may a robot, drone, etc. Because the ego object 102 is described as a host vehicle, the environment is shown as roadways 100. However, the environment is based on the type of object, for example, a robot may be in a hospital environment.

In FIG. 1, the roadways 100 illustrate an example physical environment of the ego object 102. The roadways 100 may also include general objects. The general objects may be categorized as reactive objects or inert objects based on whether a change in the state of the object can be caused by another object. Reactive objects change state based on other general objects on the roadways 100, while inert objects do not. For example, given the roadway scenario, the reactive object 104 may be a proximate vehicle because it reacts to other objects, such as traffic lights, vehicles, and pedestrians. In particular, the reactive object 104 may stop or yield to a pedestrian. The reactive object 104 may be travelling in the same direction or a different direction than the ego object 102. In this example, a single reactive object is described, but as will be discussed below, multiple reactive objects may be traversing the roadways 100 and accounted for using the systems and methods described herein.

Unlike the reactive object 104, the inert object 106 is not affected by other objects. In the roadway scenario, the inert object 106 may be roadway infrastructure, such as a traffic light, that changes from green to red generally regardless of the behavior of general objects on the roadways 100. Accordingly, here, the inert object 106 is a traffic light having an image sensor that manages the roadways 100.

Figure 2:
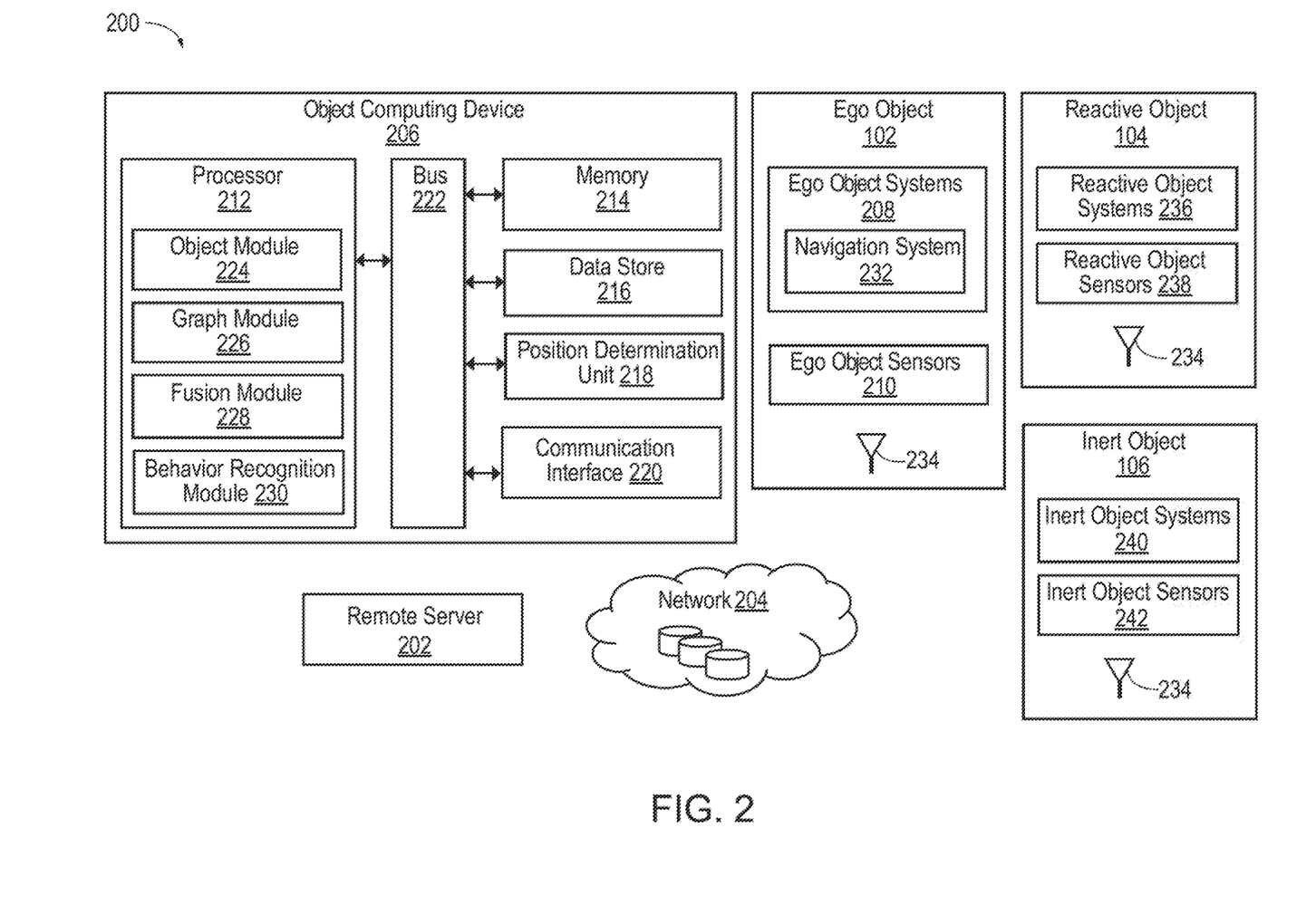
FIG. 2 is a block diagram of an operating environment for tactical behavior recognition according to an exemplary embodiment.

The ego object 102 traverses the roadways 100 and accounts for the reactive object 104 and the inert object 106 using tactical behavior recognition. FIG. 2 is a block diagram of the operating environment 200 for tactical behavior recognition for the ego object 102 according to an exemplary embodiment. One or more of the components of the operating environment 200 can be considered in whole or in part a communication network, such as a vehicle communication network. The ego object 102 communicates with the reactive object 104, the inert object 106, and/or a remote server 202 over a network 204. An operational computing device (OCD) 206 may be provided at the ego object 102, a remote server (not shown), or other remote location operably connected to the ego object 102 via the network 204. Ego object systems 208 and ego object sensors 210 communicate information about the ego object 102 and its surrounding environment to the OCD 206.

Generally, the OCD 206 includes a processor 212, a memory 214, a data store 216, a position determination unit 218, and a communication interface 220, which are each operably connected for computer communication via a bus 222 and/or other wired and wireless technologies defined herein. The OCD 206, can include provisions for processing, communicating, and interacting with various components of the ego object 102 and other components of the operating environment 200. In one embodiment, the OCD 206 can be implemented with the ego object 102, for example, as part of a telematics unit, a head unit, an infotainment unit, an electronic control unit, an on-board unit, or as part of a specific object control system, among others. In other embodiments, the OCD 206 can be implemented remotely from the ego object 102, for example, with a portable device (not shown) or the remote server 202, connected via the network 204.

The processor 212 can include logic circuitry with hardware, firmware, and software architecture frameworks for remote control of the ego object 102 by multiple operators. Thus, in some embodiments, the processor 212 can store application frameworks, kernels, libraries, drivers, application program interfaces, among others, to execute and control hardware and functions discussed herein. For example, the processor 212 can include an object module 224, a graph module 226, a fusion module 228, and a behavior recognition module 230, although it is understood that the processor 212 can be configured into other architectures.

The memory 214 and/or the data store 216 may store data about the ego object 102, such as the sensor data. Further, in some embodiments, the memory 214 and/or the data store 216 can store similar components as the processor 212 for execution by the processor 212. The modules of the processor 212 may access the position determination unit 218 via the bus 222. The position determination unit 218 can include hardware (e.g., sensors) and software to determine and/or acquire position data about the ego object 102. For example, the position determination unit 218 can include a global positioning system (GPS) unit (not shown) and/or an inertial measurement unit (IMU) (not shown). Thus, the position determination unit 218 can provide a geo-position of the ego object 102 based on satellite data from, for example, a global position source (not shown), or from any Global Navigational Satellite infrastructure (GNSS), including GPS, Glonass (Russian) and/or Galileo (European). Further, the position determination unit 218 can provide dead-reckoning data or motion data from, for example, a gyroscope, accelerometer, magnetometers, among other ego object sensors 210. In some embodiments, the position determination unit 218 can be a component of the navigation system 232 of the ego object systems 208 that provides navigation maps and navigation information to the ego object 102.

The communication interface 220 can include software and hardware to facilitate data input and output between the components of the OCD 206 and other components of the operating environment 200. Specifically, the communication interface 220 can include network interface controllers (not shown) and other hardware and software that manages and/or monitors connections and controls bi-directional data transfer between the communication interface 220 and other components of the operating environment 200 using, for example, the network 204.

More specifically, in one embodiment, the OCD 206 can exchange data and/or transmit data, such as the sensor data, with other operably connected devices via a transceiver 234 or other communication hardware and protocols. For example, the transceiver 234 can exchange data with a vehicle occupant, consumer, or manufacturer of the ego object 102. In some embodiments, the ego object 102 can also exchange data (e.g., sensor data as will be described herein) over remote networks by utilizing a wireless network antenna (not shown), roadside equipment (not shown), the portable device, and/or the network 204 (e.g., a wireless communication network), or other wireless network connections.

Referring again to the ego object 102, the ego object systems 208 can include any type of vehicle control system and/or vehicle described herein to enhance the ego object 102 and/or driving of the ego object 102. For example, the ego object systems 208 can include autonomous driving systems, remote control systems, driver-assist systems, adaptive cruise control systems, or any other advanced driving assistance systems (ADAS). Here, the ego object systems 208 may include a navigation system 232. The navigation system 232 stores, calculates, and provides route and destination information and facilitates features like turn-by-turn directions, path planning, etc.

The ego object sensors 210, which can be implemented with the ego object systems 208, can include various types of sensors for use with the ego object 102 and/or the ego object systems 208 for detecting and/or sensing a parameter of the ego object 102, the ego object systems 208, and/or the environment surrounding the ego object 102. For example, the ego object sensors 210 can provide data about general objects including downstream objects in proximity to the ego object 102. For example, the ego object sensors 210 can include, but are not limited to: acceleration sensors, speed sensors, braking sensors, proximity sensors, vision sensors, ranging sensors, seat sensors, seat-belt sensors, door sensors, environmental sensors, yaw rate sensors, steering sensors, GPS sensors, among others. It is also understood that the ego object sensors 210 can be any type of sensor, for example, acoustic, electric, environmental, optical, imaging, light, pressure, force, moisture, thermal, temperature, proximity, among others.

In addition to receiving data from the ego object systems 208 and the ego object sensors 210, the OCD 206 may receive data from reactive object systems 236 and reactive object sensors 238 of the reactive object 104 and inert object systems 240 and inert object sensors 242 of the inert object 106. The reactive object systems 236 and the inert object systems 240 may be similar to the ego object systems 208 of the ego object 102. Likewise, the reactive object sensors 238 and the inert object sensors 242 may be similar to the ego object sensors 210 of the ego object 102. The reactive object systems 236, the reactive object sensors 238, the inert object systems 240, and/or the inert object sensors 242 may include additional or alternative systems and sensor based on the type of object, the environment, the position of the object, acuity of the sensors, and communication and/or sensor range, among others.

Using the system and network configuration discussed above, a remaining value of the ego object 102 can be estimated. The remaining value may be provided to a consumer or a third party to facilitate the consumer or third party making more informed decisions regarding the ego object 102. Detailed embodiments describing exemplary methods using the system and network configuration discussed above will now be discussed in detail.

II. Methods for Estimating a Remaining Value

Figure 3:
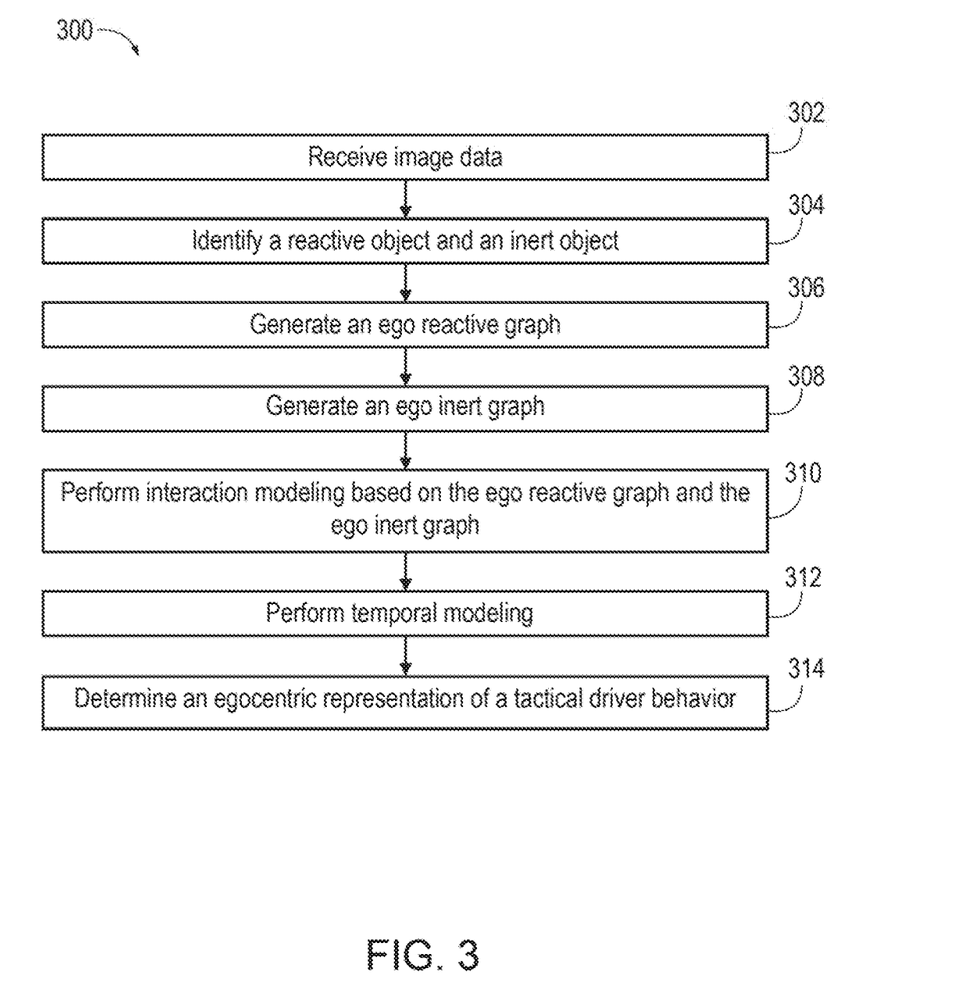
FIG. 3 is a process flow for tactical behavior recognition according to an exemplary embodiment.

Referring now to FIG. 3, a method 300 for estimating a remaining value for the ego object 102 according to an exemplary embodiment. FIG. 3 will also be described with reference to FIGS. 1, 2, 4, and 5. As shown in FIG. 3, the method 300 can be described by a number of steps for estimating the remaining value for the ego object 102. For simplicity, the method 300 will be described by these steps, but it is understood that the steps of the method 300 can be organized into different architectures, blocks, stages, and/or processes.

At block 302, the method 300 includes receiving observational data about the environment of the ego object 102. The observational data is received at the object module 224 by the object module 224 for processing. The observational data may be received from the ego object systems 208 and/or the ego object sensors 210. Additionally or alternatively, the observational data may be received from the reactive object systems 236, the reactive object sensors 238, the inert object systems 240, and/or the inert object sensors 242 via the network 204. The observational data may also be received from the remote server 202.

The observational may include current data that reflects the environment of the ego object 102 at a current point in time. The observational data may include historical data observed at a previous point in time. For example, the data store 216 and/or the remote server 202 may store historical data for the environment even when the ego object 102 did not occupy the environment. The observational data may also include forecast data for the environment that is based on the current data and/or the historical data.

In one embodiment, the observational data includes image data received by the ego object sensors 210. For example, the image data may be captured by a camera (not shown) of the ego object 102. With regard, the exemplary processing architecture 400 of FIG. 4, the image data may include observational data of frames 402 that are captured by the camera of a camera system of the ego object systems 208 of the environment of the ego object 102. The image data may additionally be received from other types of image sensors as well as light sensors such as a light detection and ranging (LiDAR) devices.

At block 304, the method 300 includes identifying a reactive object and an inert object from the general objects based on the observational data. In one embodiment, upon receiving the observational data, the object module 224 may apply instance segmentation to obtain instance-level objects denoted as reactive objects. The object module 224 may also apply semantic segmentation to extract sematic level objects denoted as inert objects.

The graph module 226 then uses extraction techniques are based on intermediate 3D convolutional features to extract object appearance features from the image data. For example, block 306 of method 300 includes generating an ego reactive graph for the reactive object based on a reactive feature of the reactive object and a reactive position vector of the reactive object relative to the general objects. As shown in the processing architecture 400 of FIG. 4, the object module 224 may generate bounding boxes 404 around reactive objects, such as the reactive object 104. The bounding boxes 404 may be further generated for other reactive objects, such as, in the roadway scenario, road users including not be limited to, cars, pedestrians, bicycles, motor cycles, busses, trains, trucks, and the like. The object module 224 may keep top detections on each frame from all of the aforementioned classes.

Figure 4:
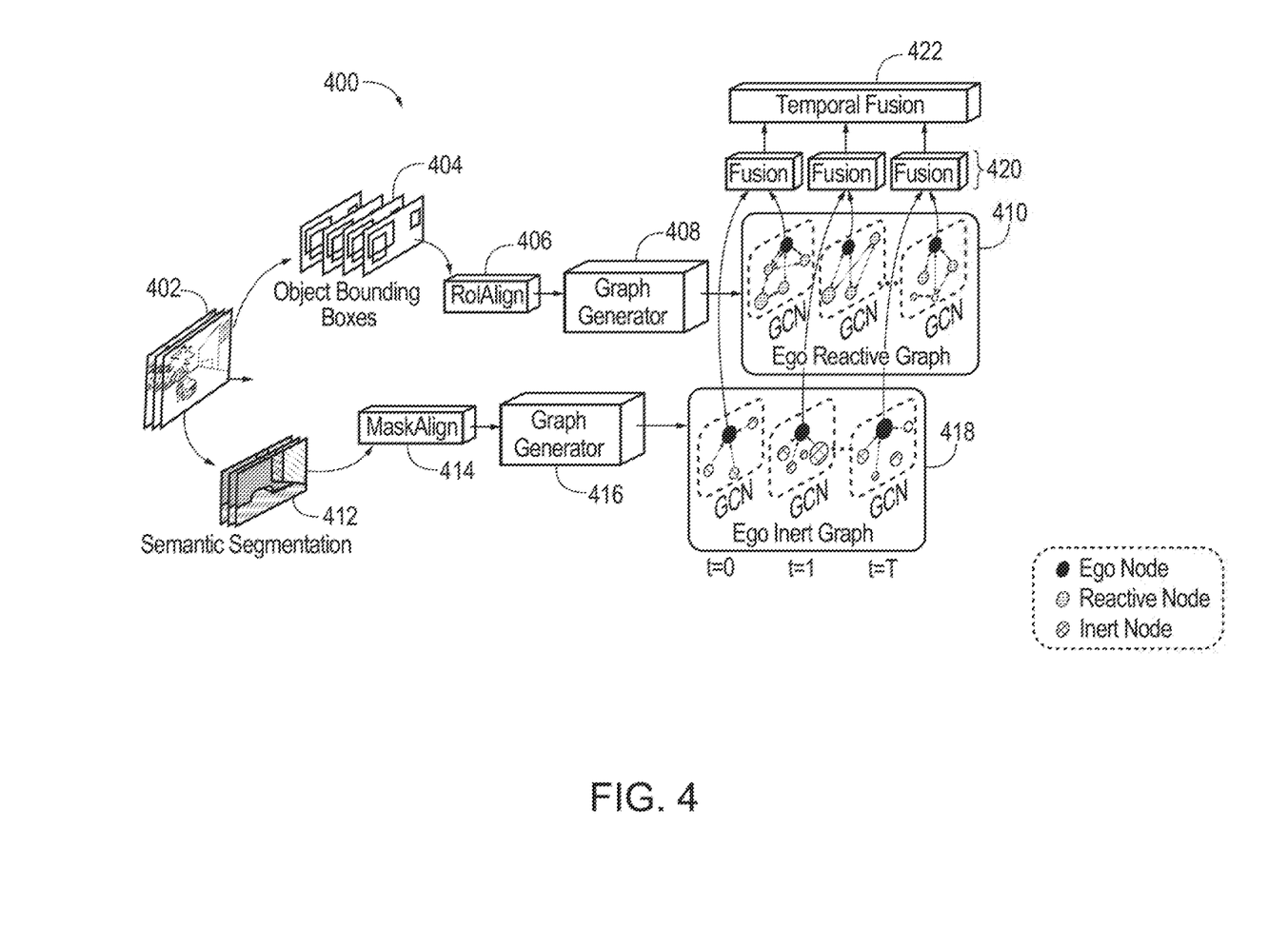
FIG. 4 is an exemplary diagram of a processing architecture associated with tactical behavior recognition according to another embodiment.

The graph module 226 generates reactive features that are nodes for graphs including an ego reactive graph and ego inert graph using regular shape extraction techniques. For example, the graph module 226 may apply a RoIAlign extraction technique 406 to obtain the reactive features of each bounding box. As will be discussed in greater detail below, a max polling layer may be utilized by the system to obtain a 1×D dimensional appearance reactive features of the reactive object 104. These reactive features are reactive nodes that are used by the graph module 226 to generate the ego reactive graph for the reactive object 104. In one embodiment, the processing architecture 400 may include a graph generator 408 for generating the ego reactive graphs 410. The graph generator 408 may be a component of the graph module 226 or located remotely. The ego reactive graphs 410 for the reactive object 104 may be processed to model interactions among the ego object 102 and the reactive object 104.

Although described with respect to modeling interactions between the ego object 102 and the reactive object 104. However, the graph module 226 may generate ego reactive graph for additional reactive objects. For example, in the roadway scenario of FIG. 1, suppose that the ego object 102 is a host vehicle making a left turn 108. Accordingly, the graph module 226 may generate an ego reactive graph for the pedestrian 110 in that a first grouping 112.

The first grouping 112 may be considered a high priority due to the path planning of the ego object 102. For example, the navigation system 232 may determine that the ego object 102 should make the left turn 108 within a threshold distance. In particular, the threshold distance may be that the left turn 108 is to be made within 5 meters. In response to that determination, the first grouping 112 may be deemed a high priority. The graph module 226 may identify interactions in the first grouping 112 is imminent as will be discussed in greater detail below.

Other reactive objects, not in the first grouping 112, may also be identified by the object module 224 and the graph module 226 may generate ego reactive graphs for those reactive objects. For example, general objects in a second group 114 may be identified. Thus, in the roadway scenario, vehicle and different movable traffic participants may be classified and included within the generated bounding boxes. The ego reactive graph(s) may be processed to model a spatial relationship between the ego object 102 and any other reactive object on the roadways 100.

Because the modeling is spatial in nature, the ego reactive graphs 410 for the reactive objects are based on a reactive feature of the reactive objects, such as the reactive object 104, the pedestrian 110, etc., and a reactive position vector of the reactive object relative to the general objects. The reactive position vectors may be determined by object module 224 during identification. With regard to the first grouping 112, the reactive position vectors may include a first reactive position vector 116 between the ego object 102 and the reactive object 104, a second reactive position vector 118 between the ego object 102 and the pedestrian 110, and a reactive third position vector 120 between the reactive object 104 and the pedestrian 110. The reactive position vectors may also be determined with respect to object in the second grouping 114.

In one embodiment, the ego reactive graphs 410 may be a sequence denoted as $G^{E\_T}=\{G_t^{E-T}|t=1,\ldots,T\}$, where T is the number of the frames 402 and $G_t^{E-T} \in \mathbb{R}^{(K+1)\times(K+1)}$ an ego reactive graph of the ego reactive graphs 410 at time t representing the pair-wise interactions among the reactive objects and the ego object 102. Specifically, $G_t^{E-T}(i,j)$ denotes the influence of the object j on object i. Where object j may be the reactive object 104 or the inert object 106 reactive object and object i may be the ego object 102. The object j may also be the ego object 102 and object i may be the reactive object 104 or the inert object 106. In yet another embodiment, the object j may also be the reactive object 104 and object i may be the the inert object 106 and vice versa, and so on such that the interactions between each of the object.

In a similar manner, the graph module 226 may generate ego inert graphs for inert objects identified by the object module 224. With regard to the method 300 of FIG. 3, block 308 includes generating an ego inert graph for the inert object 106 based on an inert feature of the inert object 106 and an inert distance 122 between the inert object 106 and the ego object 102. The graph module 226 may generate the ego inert graph to better depict the contours of the inert object 106. Therefore, the reactive objects and the inert objects are modeled differently. With regard to the inert object 106, the graph module 226 may model the spatial relation between the ego object 102 and inert objects, such as the inert object 106, and to consider first-order interactions that inert objects have on the ego object 102.

Inert objects may include, but may not be limited to a crosswalk, a landmark, a lane separator, a roadway, a service lane, a traffic island, a traffic light, and a traffic sign, among others. The graph module 226 may identify inert features, as nodes of the ego inert graph, using an extraction approach. For example, returning to the processing architecture 400 of FIG. 4, the object module 224 may apply semantic segmentation 412 to identify inert objects, such as the inert object 106. The graph module 226 may utilize irregular shape extraction techniques approach of inert features of the inert objects, including the inert object 106. The irregular shape extraction techniques may be, for example, MaskAlign extraction techniques 414 to represent features from a binary mask.

In one embodiment, the MaskAlign extraction techniques 414 extract features for a binary mask, $M_i^t$, where i is an object, such as the inert object 106 at the time t. $M_i^t$ is down-sampled to $M_i^h(W\times H)$ with the same spatial dimension as the intermediate I3D feature map X (T×W×H×D). Accordingly, the inert features may be calculated as:

$$x_i^t = \frac{\sum_{w=1}^{W}\sum_{h=1}^{H} X_{(w,h)}^t \cdot M_{i(w,h)}^{t'}}{\sum_{w=1}^{W}\sum_{h=1}^{H} M_{i(w,h)}^{t'}}$$

where $X_{(w,h)}^t \in \mathbb{R}^{1\times D}$ is the D-dimension feature at pixel (w, h) for time t. $M_{i(w,h)}^h$ is a binary scalar indicating whether the object i exists at pixel (w, h).

In a similar manner as described above with respect to the graph generator 408, inert features are inert nodes that are used by a graph generator 416 to generate the ego inert graphs 418 for the reactive object 104. The graph generator 416 may also be a component of the graph module 226 or located remotely. The graph generator 416 may be similarly situated if not the same as the graph generator 408.

With regard to the method 300 of FIG. 3, block 310 includes performing interaction modeling based on the ego reactive graphs 410 and the ego inert graphs 418 to generate updated features. Accordingly, the interactions between the ego object, the reactive objects, and the inert objects are modeled via graph convolutional networks instead of simply weighting and concatenating features of the objects.

Upon generating the ego reactive graphs 410 and the ego inert graphs 418, the fusion module 228 may utilize a graph convolutional network to perform message passing. The graph convolutional networks may take the graph structures as inputs, allow information to pass through pre-defined edges, and then output the updated features. The updated features are be updated ego features modeling interactions. At each time step t, the updated ego features from the ego reactive graphs 410 and the ego inert graphs 418 are fused and temporally processed via the fusion module 228.

The graph convolution can be expressed as:

$$Z^{l+1}=GZ^l W^l + Z^l$$

where G is an affinity matrix from graphs. Taking an ego reactive graph 410 as an example, $Z^l \in \mathbb{R}^{(K+1)\times D}$ is the appearance feature matrix nodes in the l-th layer. $W^l \in \mathbb{R}^{D\times D}$ is the learnable weight matrix. We also build a residual connection by adding $Z^l$. Layer Normalization and ReLU before $Z^{l+1}$ is fed to the next layer. In some embodiments, second order interactions are not considered in ego inert graphs 418 but in ego reactive graphs 410, one layer graph convolutional networks may be used for ego inert graphs 418 and two layer graph convolutional networks may be used for ego reactive graphs 410.

Figure 5:
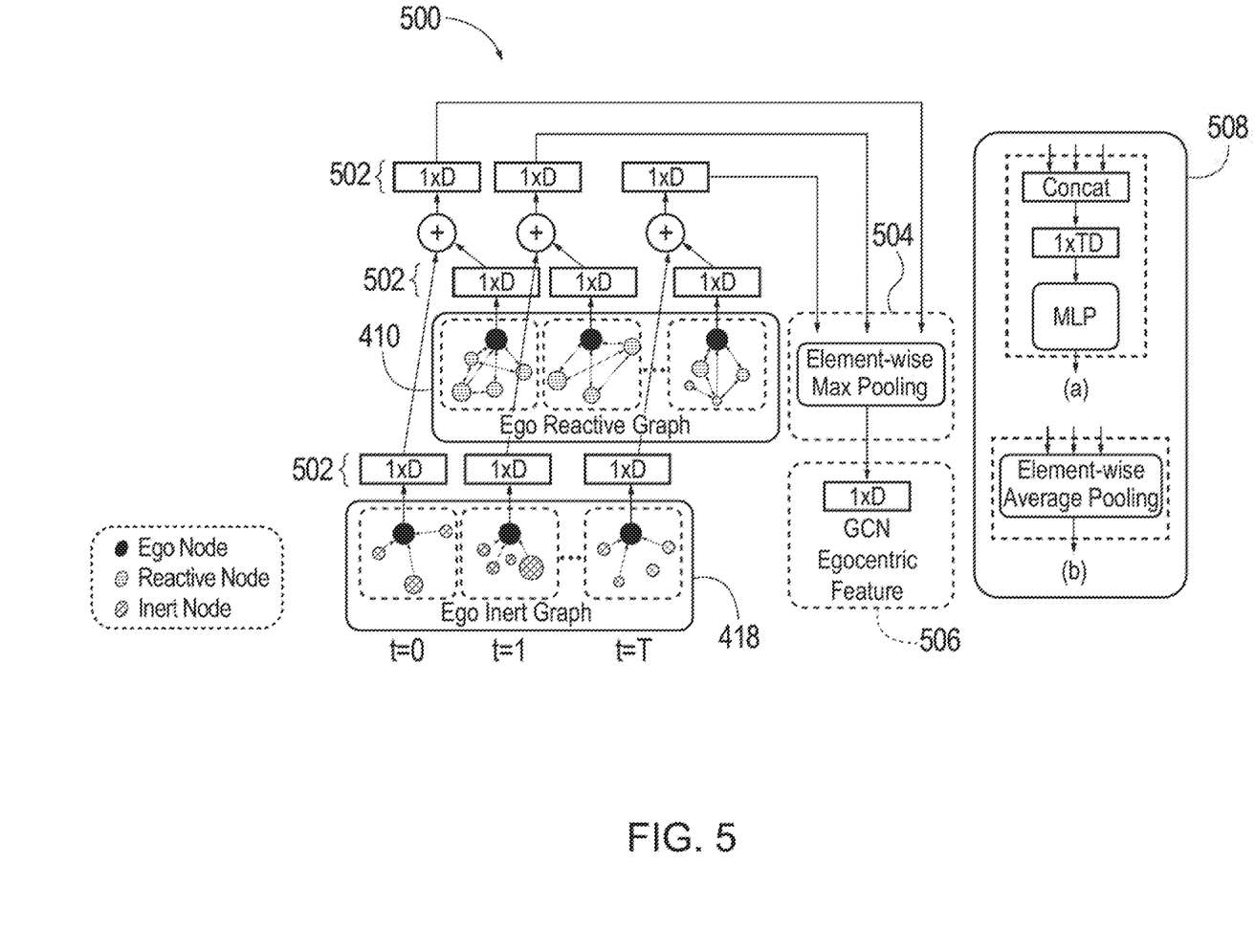
FIG. 5 is an exemplary diagram of a modeling architecture associated with tactical behavior recognition according to another embodiment.

With regard to the method 300 of FIG. 3, block 312 includes performing temporal modeling. The temporal modelling includes performing temporal fusion 422. Turning to the modeling architecture 500 of FIG. 5, the fusion module 228 may derive 1×D dimensional features 502 from the ego reactive graphs 410 and the ego inert graphs 418. These may derive 1×D dimensional features 502 may be combined into a set of may derive 1×D dimensional features 502 using fusion techniques 420. The nodes in graph $G_t^{E-T}$ correspond to a set of objects $\{x_i^t|i=1,\ldots,K+1\}$, where $x_i^t \in \mathbb{R}^{1\times D}$ being the 1×D dimensional features 502. The edge values $G_t^{ET}(i,j)$ may be calculated given:

$$G_t^{ET}(i,j) = \frac{f_s(p_i^t, p_j^t)\exp(f_a(x_i^t, x_j^t))}{\sum_{j=1}^{K+1} f_s(p_i^t, p_j^t)\exp(f_a(x_i^t, x_j^t))}$$

where $f_a(x_i^t, x_j^t)$ indicates the appearance relation between two objects. Furthermore a distance constraint is setup via a spatial relation $f_s(p_i^t, p_j^t)$. In one embodiment, a Softmax function is used to normalize the influence on an object i from the other objects. The appearance relation may be calculated as $$f_a(x_i^t, x_j^t) = \frac{\phi(x_i^t)^T \phi'(x_j^t)}{\sqrt{D}}$$

where $\phi(x_i^t) = wx_i^t$ and $\phi(x_j^t) = w'x_j^t$. Both $w \in \mathbb{R}^{D \times D}$ and $w' \in \mathbb{R}^{D \times D}$ are two learnable parameters that may be determined from historical data stored in the memory 214 and/or the data store 216. The historical data may be based on previous interactions of the ego object with reactive objects and/or inert objects. Both $w \in \mathbb{R}^{D \times D}$ and $w' \in \mathbb{R}^{D \times D}$ map appearance features to a subspace and enable learning the correlation of two objects. $\sqrt{D}$ is a normalization factor.

A spatial reflation arises from the fact that interactions between distant objects is less imminent and possibly even scarce. For example, as discussed above, the first grouping 112 is a more imminent interaction as it relates to the ego object 102 than the second grouping 114 because the first grouping 112 is closer to the ego object 102. As described above, objects that are closer to the ego object 102 are prioritized over more distant objects. To calculate this relation, objects are projected from the 2D image plane to the 3D space in the world frame $$[xyz1]^T = \partial_{u,v} \cdot P^{-1} [uv1]^T$$

where $[x\ y\ z\ 1]^T$ and $[u\ v\ 1]^T$ are homogeneous representations in 2D and 3D coordinate systems, P is the intrinsic matrix, and $\partial_{u,v}$ is the relative depth at (u, v) obtained by depth estimation accordingly, the spatial relation function $f_s$ is formulated as:

$$f_s(p_i^t, p_j^t) = \mathbb{I}(d(p_i^t, p_j^t) \leq \mu)$$

where $\mathbb{I}(\cdot)$ is the indication function $d(p_i^t, p_j^t)$ computes the Euclidean distance between object i and j in the 3D space, and p is a distance threshold which regulates the spatial value to be zero if the distance is beyond an upper bound. In this manner, objects that are greater distance away than the upper bound are not considered. For example, if the second grouping 114 would not be considered relative to the ego object if the second grouping 114 is a greater distance away than the upper bound. In one embodiment, μ may be set to 3.0.

In some embodiments, the ego inert graphs may be ignored as the interactions among inert objects since they are insusceptible to other objects. Hence, we set fs to zeros for every pair of stuff objects and only pay attention to the influence that inert objects act on ego object. We call it as the first-order interaction. To better model the spatial relations, instead of unprojecting bounding box centers, we map every pixel inside the down-sampled binary mask $M_i^t$ to 3D space and calculate the Euclidean distance between every pixel with the ego object 102. The distance is the minimum distance, as described above.

Additionally, the fusion module 228 may apply element-wise max pooling 504 to the reactive features and the inert features to calculate a 1×D feature vector 506 which may be labeled as a graph convolutional network egocentric feature(s). Ego features are aggregated by an element-wise summation from two types of graphs including the ego reactive graphs 410 and the ego inert graphs 418. Then these time-specific ego features are fed into the fusion module 228, which applies the element-wise max pooling 504 to obtain a 1×D feature vector 506. Additional modes 508 are alternative embodiments of temporal fusion 422 according to block 312. In 508(a) utilizes multi-layer perceptions (MLP) as temporal modeling. A similar approach is used in order to capture the temporal ordering of patterns. In 508(b) the temporal fusion 422 can also be replaced by element-wise average pooling.

Returning to the method 300, block 314 includes determining an egocentric representation of a tactical driver behavior. In particular, the temporally fused egocentric feature(s) may be further concatenated with the I2D head features, which serves as a global video representation to form the egocentric representation of a complicated driving situation(s). The behavior recognition module 230 may further pass the egocentric representation through a fully connected layer to obtain one or more final classification associated with the complicated driving situation(s).

In one embodiment, the classifications may include a classification of actions associated with the ego object with respect to the complicated driving situations(s). For example, suppose that the ego object 102 is a host vehicle, the classifications may include a goal-oriented action that may be associated with goals of the driver of the hose vehicle, a stimulus-driven action that may be associated with one or more stimuli that may prompt a particular driving action, and a cause that may indicate the cause for implementing a driving action.

Accordingly, a system for tactical behavior recognition using graph convolutional networks has been described. Given the roadway scenario, the system is capable complicated interactions with respect to how humans drive and interact with road users in complicated driving situations in space and time. The system utilizes graph convolution networks to model spatial-temporal interactions. As discussed in modules of the processor may decompose the complicated interactions into an ego-reactive interaction and an ego-inert interaction. The two interactions may embed how reactive objects (e.g., vehicles and pedestrians) and inert objects (e.g., lane marking and traffic light) may influence tactical driving behavior of the ego object 102. The behavior recognition module 230 may then determine tactical driving behavior by jointly reasoning the ego-reactive interaction and an ego-inert interaction with respect to a particular driving situation.

As discussed above, a graph convolutional neural network is used to determine particular tactical behaviors. In particular, the system may categorize the tactical behaviors into an object related category (e.g., stop for oncoming vehicles) and an infrastructure related category (e.g., right land change or stop for traffic light). In this manner, the tactical behaviors may be classified. Accordingly, the systems and methods described herein may process two respective graphs to model the object related category and the infrastructure related category.

Computer Implementation Embodiments

Figure 6:
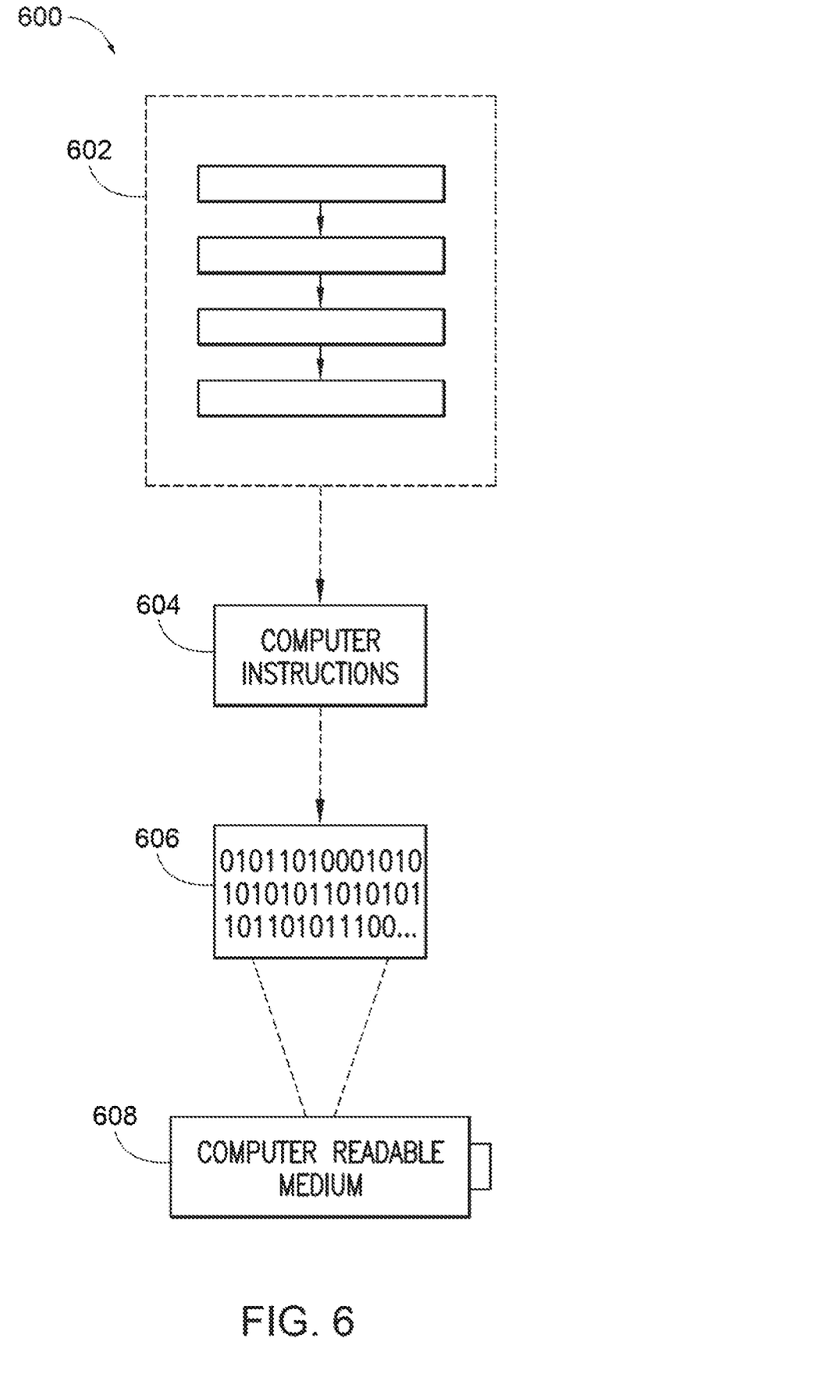
FIG. 6 is an illustration of an example computer-readable medium or computer-readable device including processor-executable instructions configured to embody one or more of the provisions set forth herein, according to one embodiment.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 300 of FIG. 3. In another aspect, the processor-executable computer instructions 604 may be configured to implement a system, such as the operating environment 200 of FIG. 2. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
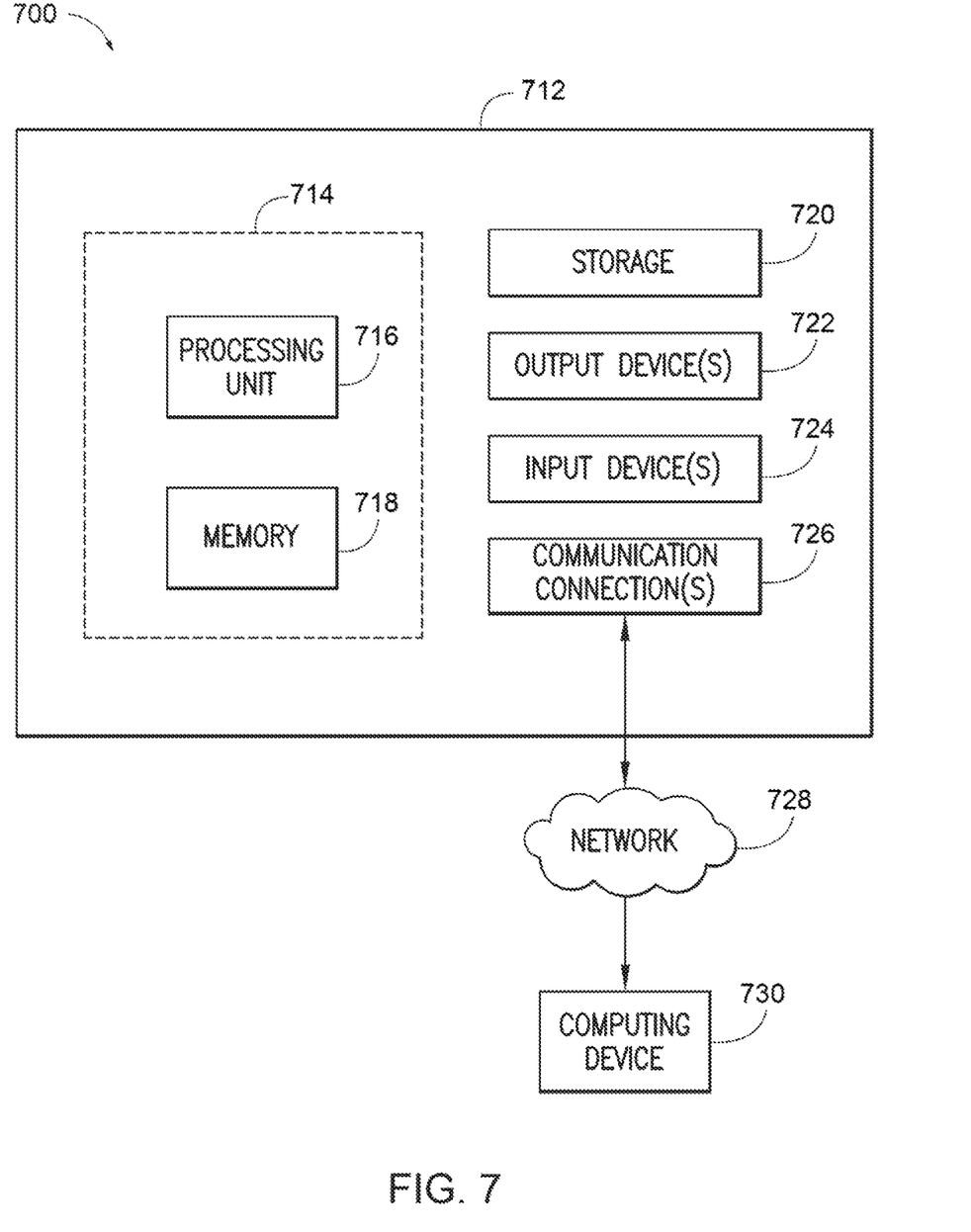
FIG. 7 is an illustration of an example computing environment where one or more of the provisions set forth herein are implemented, according to one embodiment.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one aspect provided herein. In one configuration, the computing device 712 includes at least one processing unit 716 and memory 718. Depending on the exact configuration and type of computing device, memory 718 may be volatile, such as RAM, nonvolatile, such as ROM, flash memory, etc., or a combination of the two. This configuration is illustrated in FIG. 7 by dashed line 714.

In other aspects, the computing device 712 includes additional features or functionality. For example, the computing device 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by the processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 712. Any such computer storage media is part of the computing device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 712 includes input device(s) 724 such as keyboard, mouse, pen, voice input device, touch input device, infrared cameras, video input devices, or any other input device. Output device(s) 722 such as one or more displays, speakers, printers, or any other output device may be included with the computing device 712. Input device(s) 724 and output device(s) 722 may be connected to the computing device 712 via a wired connection, wireless connection, or any combination thereof. In one aspect, an input device or an output device from another computing device may be used as input device(s) 724 or output device(s) 722 for the computing device 712. The computing device 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for tactical behavior recognition comprising:
    receiving image data associated with a surrounding environment of an ego object, wherein the surrounding environment includes general objects;
    identifying a reactive object and an inert object from the general objects based on the image data;
    generating an ego reactive graph for the reactive object based on a reactive feature of the reactive object and a reactive position vector of the reactive object relative to the general objects;
    generating an ego inert graph for the inert object based on an inert feature of the inert object and an inert distance between the inert object and the ego object;
    performing interaction modeling based on the ego reactive graphs and the ego inert graphs to generate updated features;
    performing temporal modeling on the updated features; and
    determining an egocentric representation of a tactical driver behavior based at least in part on the updated features.

2. The computer-implemented method for tactical behavior recognition of claim 1, wherein the image data includes a series of frames over a range of time.

3. The computer-implemented method for tactical behavior recognition of claim 1, wherein identifying the reactive object and the inert object includes:
    performing instance segmentation to identify the reactive object from the image data; and
    performing semantic segmentation to identify the inert object from the image data.

4. The computer-implemented method for tactical behavior recognition of claim 1, wherein performing interaction modeling includes inputting the ego reactive graph and the ego inert graph to a graph convolutional network.

5. The computer-implemented method for tactical behavior recognition of claim 4, wherein a one layer graph convolutional network is used for the ego inert graph and a two layer graph convolutional network is used for the ego reactive graph.

6. The computer-implemented method for tactical behavior recognition of claim 1, further comprising classifying the tactical driver behavior.

7. The computer-implemented method for tactical behavior recognition of claim 1, wherein the ego object is a host vehicle and the reactive object is a proximate vehicle.

8. The computer-implemented method for tactical behavior recognition of claim 1, wherein the inert object is roadway infrastructure.

9. A system for tactical behavior recognition, the system comprising:
    an object module configured to receive image data of general objects associated with a surrounding environment of an ego object and identify a reactive object and an inert object from the surrounding environment based on the image data;
    a graph module configured to generate an ego reactive graph for the reactive object based on a reactive feature of the reactive object and a reactive position vector of the reactive object relative to the general objects, and generate an ego inert graph for the inert object based on an inert feature of the inert object and an inert distance between the inert object and the ego object;
    a fusion module configured to perform interaction modeling based on the ego reactive graphs and the ego inert graphs to generate updated features and performing temporal modeling on the updated features; and
    a behavior recognition module configured to determine an egocentric representation of a tactical driver behavior based at least in part on the updated features.

10. The system of claim 9, wherein the image data includes a video of the surrounding environment of the ego object.

11. The system of claim 9, wherein the object module is further configured to perform instance segmentation to identify the reactive object from the image data and semantic segmentation to identify the inert object from the image data.

12. The system of claim 9, wherein the fusion module is further configured to performing interaction modeling includes inputting the ego reactive graph into a two layer graph convolutional network and inputting the ego inert graph into a one layer graph convolutional network.

13. The system of claim 9, wherein the behavior recognition module is further configured to classify by passing the egocentric representation through a fully connected layer to obtain a classification associated with the tactical driver behavior.

14. The system of claim 9, wherein the ego object is a host vehicle, the reactive object is a proximate vehicle, and the inert object is roadway infrastructure.

15. A non-transitory computer readable storage medium storing instructions that when executed by a computer, which includes a processor perform a method, the method comprising:
    receiving image data associated with a surrounding environment of an ego object, wherein the surrounding environment includes general objects;

identifying a reactive object and an inert object from the general objects based on the image data;

generating an ego reactive graph for the reactive object based on a reactive feature of the reactive object and a reactive position vector of the reactive object relative to the general objects;

generating an ego inert graph for the inert object based on an inert feature of the inert object and an inert distance between the inert object and the ego object;

performing interaction modeling based on the ego reactive graphs and the ego inert graphs to generate updated features;

performing temporal modeling on the updated features; and determining an egocentric representation of a tactical driver behavior based at least in part on the updated features.

16. The non-transitory computer readable storage medium of claim 15, wherein identifying the reactive object and the inert object includes:

performing instance segmentation to identify the reactive object from the image data; and performing semantic segmentation to identify the inert object from the image data.

17. The non-transitory computer readable storage medium of claim 15, wherein performing interaction modeling includes inputting the ego reactive graph and the ego inert graph to a graph convolutional network.

18. The non-transitory computer readable storage medium of claim 15, further comprising classifying the tactical driver behavior.

19. The non-transitory computer readable storage medium of claim 18, further comprising classifying the tactical driver behavior.

20. The non-transitory computer readable storage medium of claim 15, wherein the ego object is a host vehicle, the reactive object is a proximate vehicle, and the inert object is roadway infrastructure.

* * * * *